United States Patent
Dueker et al.

(10) Patent No.: US 7,106,179 B1
(45) Date of Patent: *Sep. 12, 2006

(54) DEPLOYMENT SYSTEM FOR RUGGEDIZED ILLUMINATING, MARKING, OR SIGNALING DEVICE

(75) Inventors: Kenneth S. Dueker, Atherton, CA (US); Paul M. Hagelin, Saratoga, CA (US); Troy J. Edwards, Campbell, CA (US); Russell E. Tavernetti, San Carlos, CA (US)

(73) Assignee: PowerFlare Corporation, Menlo Park, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 10/712,714

(22) Filed: Nov. 12, 2003

Related U.S. Application Data

(60) Provisional application No. 60/426,248, filed on Nov. 13, 2002.

(51) Int. Cl.
*G08B 23/00* (2006.01)
(52) U.S. Cl. .................. 340/321; 340/473; 340/908.1; 362/153.1
(58) Field of Classification Search ............ 340/908.1, 340/321, 423, 932, 332, 331, 815.4, 326, 340/815.45; 362/153.1, 183, 364, 369, 800, 362/326, 157, 185, 194, 196, 200, 201, 204, 362/645, 362, 367, 363, 249
See application file for complete search history.

(56) References Cited

U.S. PATENT DOCUMENTS

| | | | |
|---|---|---|---|
| 3,164,801 A * | 1/1965 | Nicholl ........................ 340/949 |
| 3,456,103 A * | 7/1969 | Bond .......................... 362/267 |
| 4,403,274 A * | 9/1983 | Moore ......................... 362/186 |
| 4,873,933 A | 10/1989 | Bennett et al. ............... 441/36 |
| 5,103,383 A | 4/1992 | Mayhew ...................... 362/186 |
| 5,203,624 A | 4/1993 | Schier et al. ................ 362/158 |
| 5,287,257 A | 2/1994 | Schier et al. ................ 362/186 |
| 5,313,187 A | 5/1994 | Choi et al. ................... 340/331 |
| 5,319,365 A | 6/1994 | Hillinger ................. 340/908.1 |
| 5,359,448 A * | 10/1994 | Laszlo et al. ............... 398/130 |
| 5,585,783 A | 12/1996 | Hall ........................... 340/473 |
| 5,727,346 A * | 3/1998 | Lazzarini et al. ............. 42/146 |
| 5,797,672 A | 8/1998 | Dobert ....................... 362/190 |
| 5,831,522 A | 11/1998 | Weed et al. ................. 340/473 |
| 5,839,816 A | 11/1998 | Varga et al. ............. 362/153.1 |
| 5,984,570 A * | 11/1999 | Parashar ...................... 404/14 |
| D420,302 S | 2/2000 | Barnhart .................... D10/113 |
| 6,066,038 A * | 5/2000 | Sciortino et al. ............. 453/17 |

(Continued)

OTHER PUBLICATIONS

"Trek® Disco Inferno Tail Light," www.trekbikes.com, 1 pg.

(Continued)

*Primary Examiner*—Brent A. Swarthout
(74) *Attorney, Agent, or Firm*—Sawyer Law Group LLP

(57) ABSTRACT

A deployment system for illumination devices, including: a holding mechanism for engaging at least one illumination device; and a deploying mechanism for causing the at least one illumination device to exit the system. In the preferred embodiment, the deploying mechanism is at least one solenoid, where the at least one solenoid extends to cause the illumination device to exit the system. The system allows a user or an automated system to deploy illumination devices without being exposed to dangerous conditions. For example, the system can be mounted internally or externally to a law enforcement, road crew, or utility company vehicle. The user may then deploy the illumination devices to mark the road without being subjected to the dangers of oncoming traffic.

24 Claims, 10 Drawing Sheets

U.S. PATENT DOCUMENTS

| | | | | |
|---|---|---|---|---|
| 6,069,557 | A | * | 5/2000 | Anglin et al. ............... 340/321 |
| 6,134,820 | A | * | 10/2000 | Martinez ..................... 40/586 |
| 6,329,933 | B1 | | 12/2001 | Mikesic ...................... 340/946 |
| 6,515,584 | B1 | | 2/2003 | DeYoung .................... 340/475 |
| 6,549,121 | B1 | | 4/2003 | Povey et al. ................ 340/322 |
| 6,637,904 | B1 | * | 10/2003 | Hernandez .................... 362/8 |
| 6,896,392 | B1 | * | 5/2005 | Jigamian et al. ............ 362/202 |

OTHER PUBLICATIONS

Kong Young Lamps & Safety Co., Ltd., U.S. Dept. of Transportation, 6 pages.
"About the DURAFLARE," www.pittco.com, 2 pages.
"Personal Safety Lite," www.marpac.com, 4 pages.
"Portable Signal Lite," www.marpac.com, 2 pages.
"Three Lites/Three Stands Kit," www.marpac.com, 2 pages.
Led Smartbright, inovalight.com, 2 pages.
"The Signalfly Helmet Brake Light," www.webbikeworld.com, 6 pages.
"Led Safety Devices," www.dalmark.com, 1 pg.
"Active Road Marking Systems for Traffic Safety," www.dalmark.com, 2 pages.
Turboflare-Products and Technical Specifications, 3 pages.
"More than Just a Road Marker Lanelight," www.swarco.com, 2 pages.
"Low Profile Signal Head," www.crosswalks.com, 1 pg.

* cited by examiner

Isometric View

Top View

Bottom View

Front View

Left View

Right View

Back View

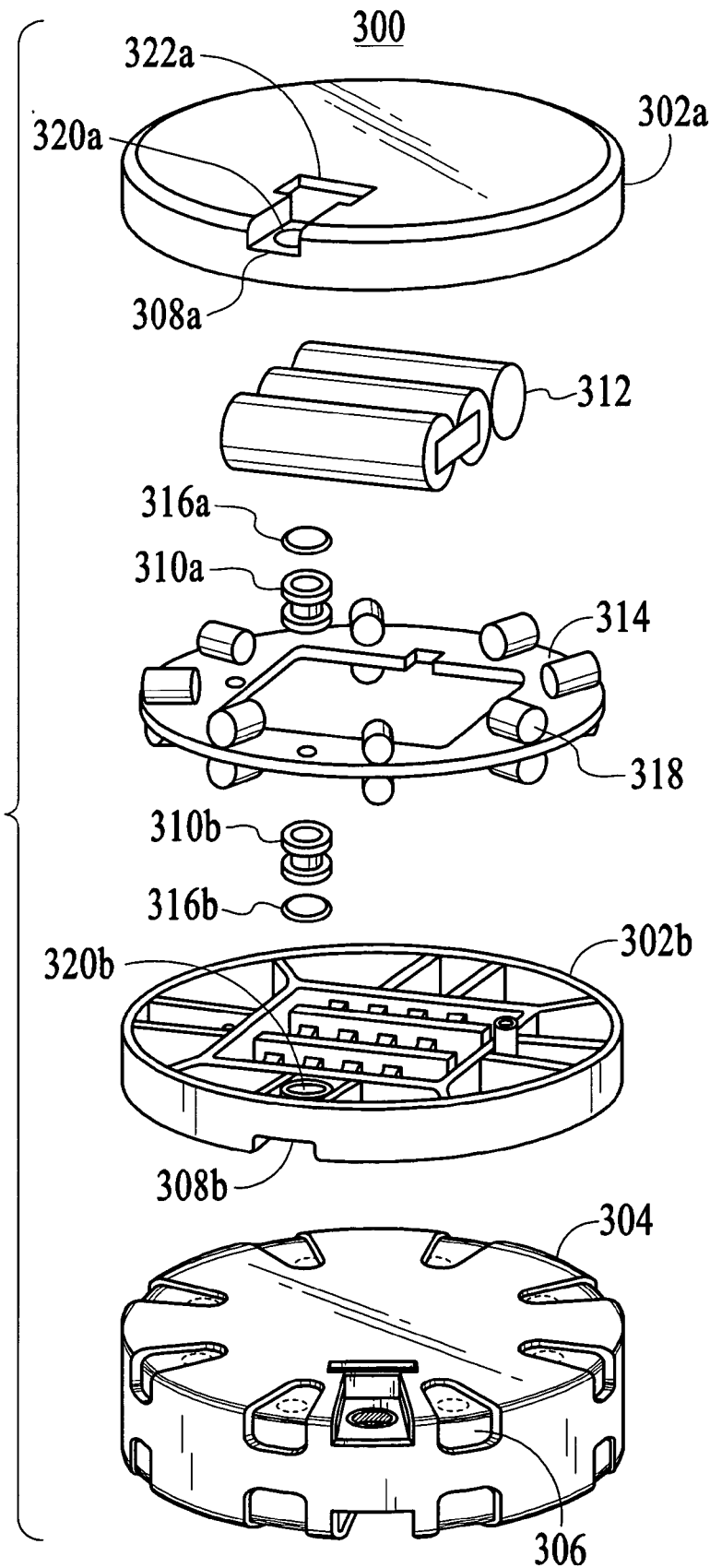

US 7,106,179 B1

DEPLOYMENT SYSTEM FOR RUGGEDIZED ILLUMINATING, MARKING, OR SIGNALING DEVICE

CROSS-REFERENCE TO RELATED APPLICATIONS

This application claims priority from co-pending U.S. Provisional Patent Application Ser. No. 60/426,248, entitled "Ruggedized Electronic Traffic Safety Device and Automated Vehicle Deployment System," filed on Nov. 13, 2002.

This application is related to co-pending regular U.S. patent application Ser. No. 10/712,431, entitled "Ruggedized Illuminating, Marking, or Signaling Device," filed on Nov. 12, 2003.

FIELD OF THE INVENTION

The present invention relates to deployment of electronic devices, and more particularly to the deployment of illuminating, marking, or signaling electronic devices.

BACKGROUND OF THE INVENTION

Emergency responders and other road workers often use incendiary flares to mark a scene of a traffic accident, road closure, or work zone. The officer must park his patrol car, open the trunk, obtain some flares, and walk back into traffic to deploy them. The officer must then light each flare and put it on the ground. While doing so, the officer is dangerously exposed to passing traffic, compounded sometimes by poor visibility. Similarly, military and search and rescue personnel often need to deploy illumination devices from vehicles, aircraft, and watercraft.

The use of incendiary flares poses numerous problems: they are a serious fire hazard and cannot be used in areas where dry brush or other hazardous or flammable materials are present; they can become chemically unstable over time; they are susceptible to moisture as well as temperature changes; they are bulky; they have a limited burn time; they are conventionally manufactured with toxic materials; and they are expensive.

Accordingly, there exists a need for an improved deployment system for illumination devices. The improved system should allow a person to easily deploy illumination devices without exposing the person to dangerous conditions. In addition, the illumination device should be easy and safe to use, durable, and cost effective. The present invention addresses such a need.

SUMMARY OF THE INVENTION

A deployment system for illumination devices, including: a holding mechanism for engaging at least one illumination device; and a deploying mechanism for causing the at least one illumination device to exit the system. The holding mechanism could be a mechanical coupling, a magnetic coupling, or a chemical adhesive. The deploying mechanism is a means of moving or allowing the movement of the illumination device with respect to the deployment system. For example, a gravity-fed door or gate release mechanism, a corkscrew mechanism, or an explosive or chemical reaction for launching the devices may be used. In the preferred embodiment, the deploying mechanism is at least one solenoid, where the at least one solenoid extends to cause the illumination device to exit the system. The system allows a person to deploy illumination devices without being exposed to dangerous conditions. For example, the system can be mounted internally or externally to a law enforcement, road crew, or utility company vehicle. The user may then deploy the illumination devices to mark the road without being subjected to the dangers of oncoming traffic. Multiple systems may be mounted internally or externally to the vehicle. Similarly, the system could be mounted internally or externally to an aircraft or watercraft. Using non-incendiary flares in a deployment system reduces the fire hazard to the vehicle.

BRIEF DESCRIPTION OF THE FIGURES

FIG. 4 illustrates an exploded view of the preferred embodiment of the illumination device utilized in the deployment system in accordance with the present invention.

DETAILED DESCRIPTION

The present invention provides an improved deployment system for illumination devices. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 8 in conjunction with the discussion below.

Figure 1:
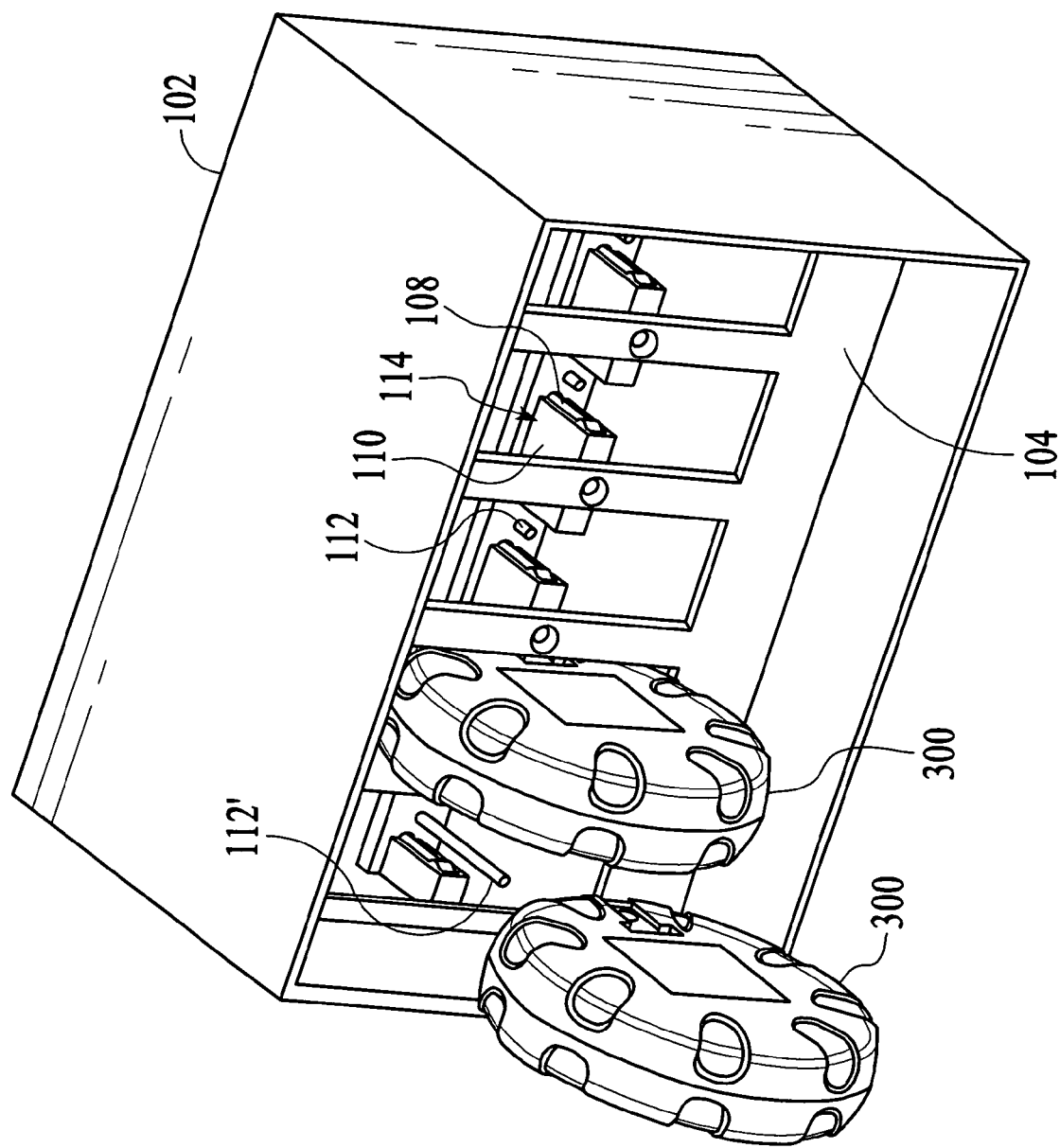
FIG. 1 illustrates a preferred embodiment of a deployment system for illumination devices in accordance with the present invention.
Figure 2:
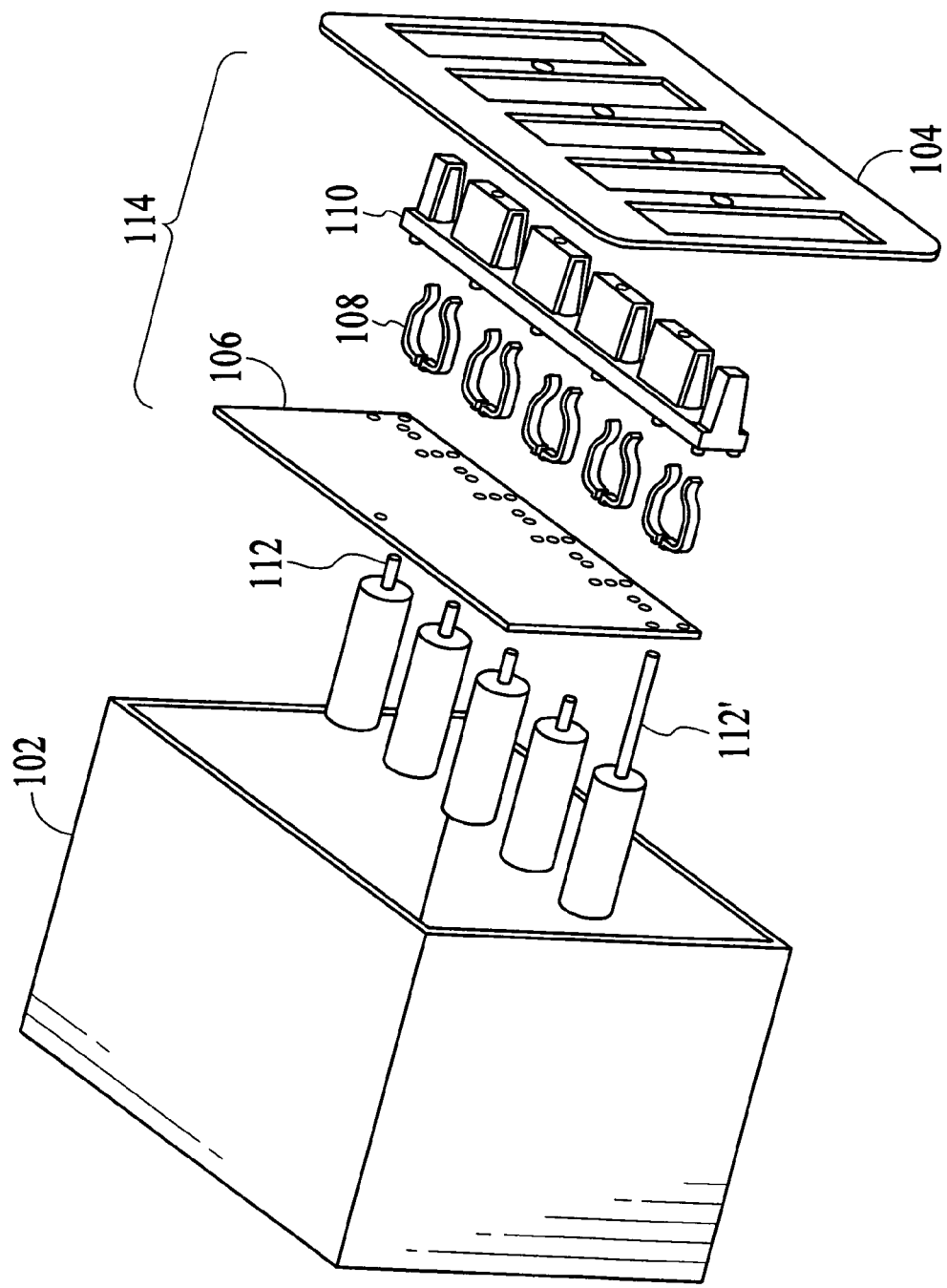
FIG. 2 illustrates an exploded view of the deployment system in accordance with the present invention.
Figure 3A:
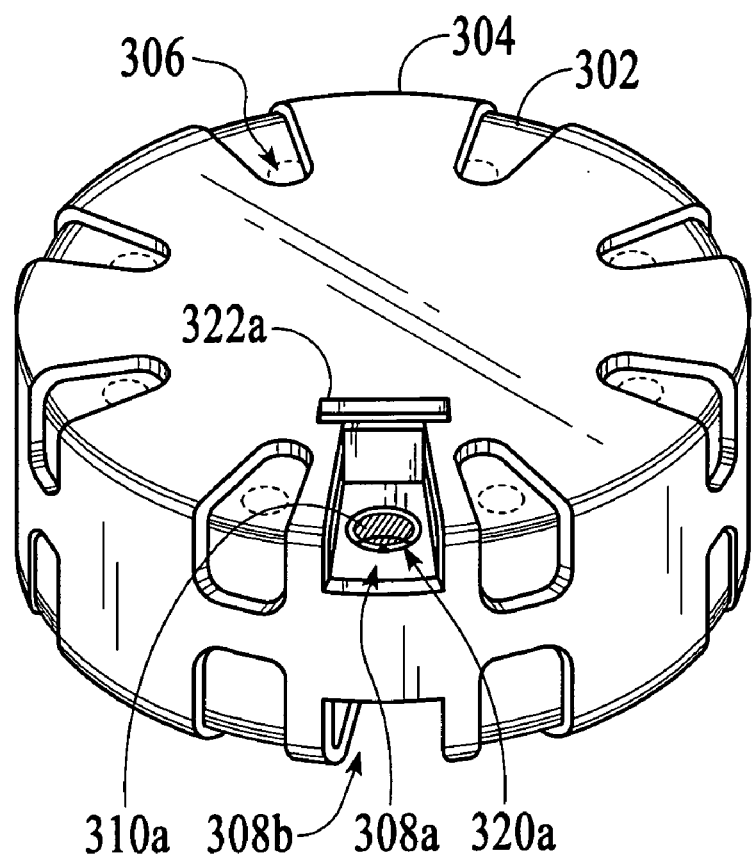
FIGS. 3A–3G illustrate an isometric, top, bottom, front, left, right and back views, respectively, of a preferred embodiment of an illumination device utilized in the deployment system in accordance with the present invention.
Figure 3B:
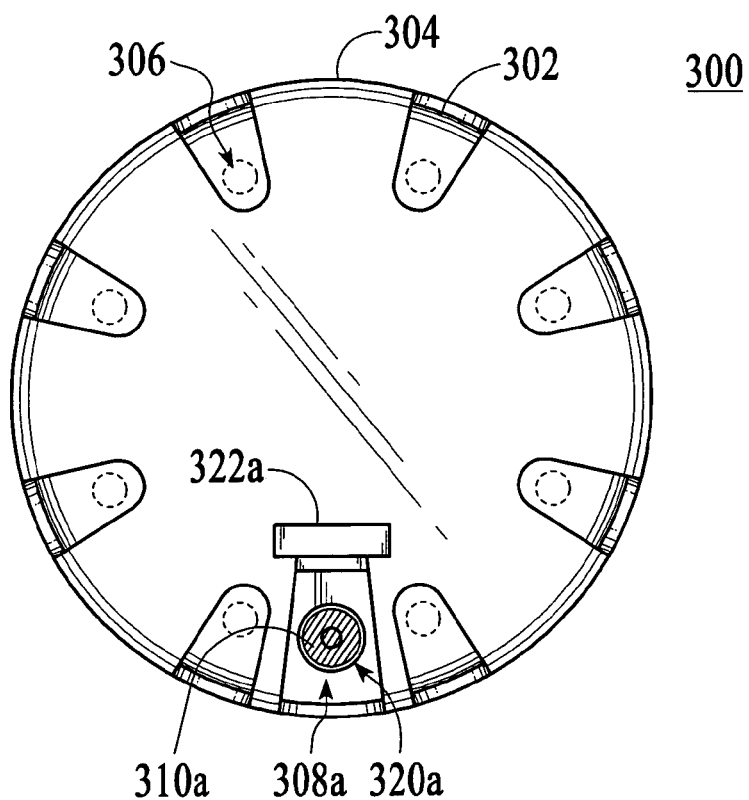
Figure 3C:
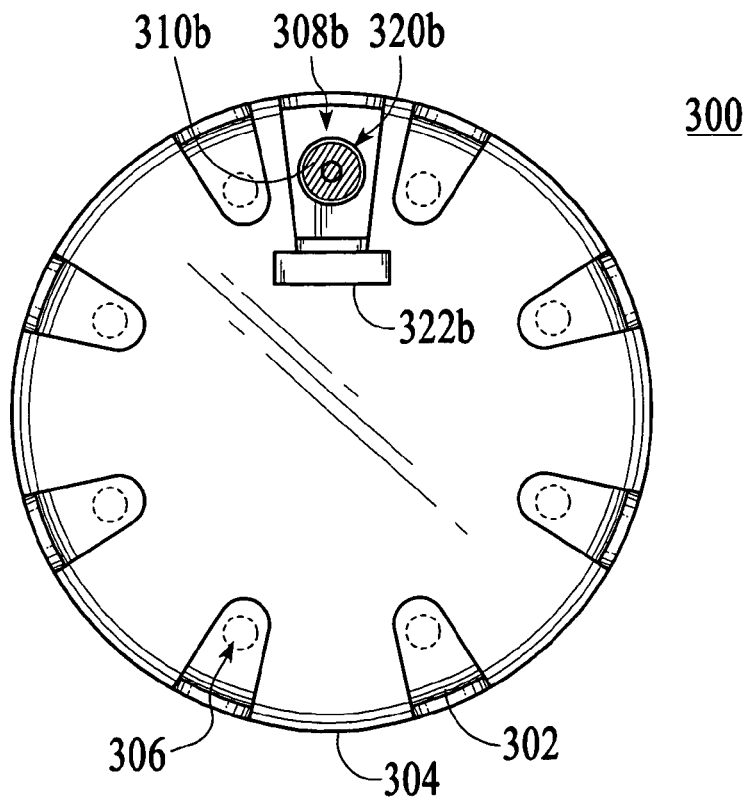
Figure 3D:
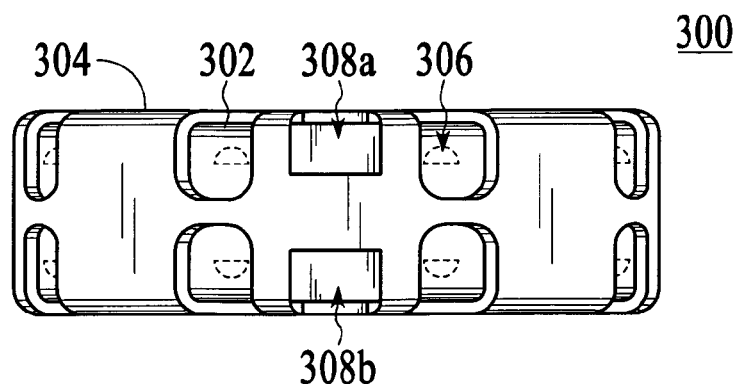
Figure 3E:
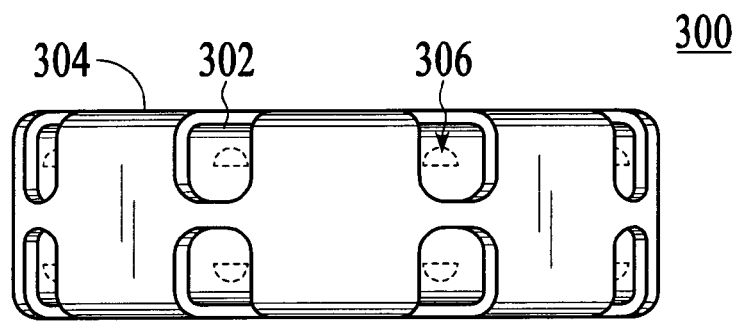
Figure 3F:
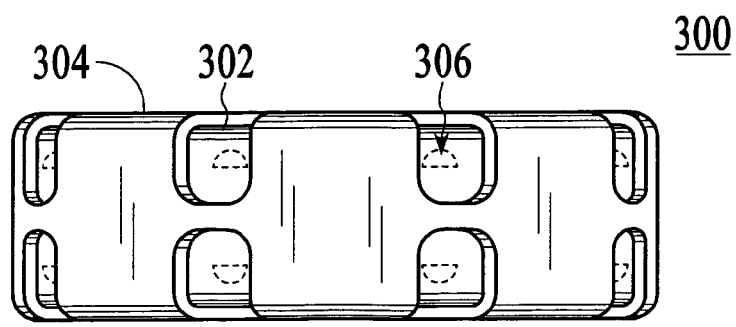
Figure 3G:
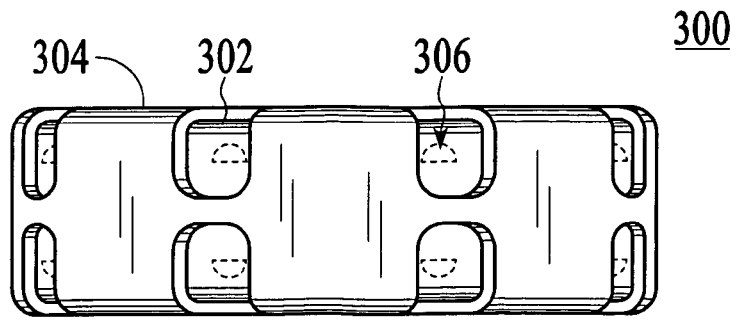

FIG. 1 illustrates a preferred embodiment of a deployment system for illumination devices in accordance with the present invention. FIG. 2 illustrates an exploded view of the deployment system in accordance with the present invention. Referring to both FIGS. 1 and 2, the deployment system comprises a housing 102 formed by a plurality of outer walls and an inner plate 104 coupled to the housing 102, forming a cavity therein. In the preferred embodiment, the inner plate 104 comprises slots through which one or more illumination devices 300 may reside while in the deployment system. Within the cavity is a charging or holding mechanism 114 for charging or holding the illumination devices 300 in the deployment system, and a deploying mechanism 112 for deploying the illumination devices 300. The mechanism 114 could be a mechanical coupling, a magnetic coupling, or a chemical adhesive. In the preferred embodiment, the holding mechanism 114 can also be a charging mechanism capable of charging any rechargeable power sources or energy sources of the illumination devices 300. The charging circuitry may be internal to or external to the illumination devices 300, or both. The mechanism 114 comprises a circuit board 106, a clamp 108, and guides 110. The guides 110 engage the illumination devices 300 as they are inserted into the deployment system to ensure proper orientation. As the illumination devices 300 are inserted, the two prongs of the clamp 108 are pushed apart. When the illumination devices 300 are fully inserted, two prongs of the clamp 108 engage contacts (hidden) on the illumination devices 300. When the clamp 108 engages the contacts, electrical connections are made between the mechanism 114 and the rechargeable power sources or energy sources (hidden) within of the illumination devices 300. The illumination devices 300 are further described below with reference to FIGS. 3A–7. One of ordinary skill in the art will understand that the mechanism 114 need not have charging capabilities to deploy the illumination devices, and will still be within the spirit and scope of the present invention.

The deployment system can further comprise a locking mechanism that prevents the illumination devices 300 from accidental deployment. For example, the locking mechanism can be a door that covers the housing 102 such that if one of the illumination devices 300 is accidentally knocked loose from its charging or holding mechanism 114 due to vibration, the illumination device 300 does not exit the deployment system.

The deploying mechanism is a means of moving or allowing the movement of the illumination devices 300 with respect to the deployment system. For example, a gravity-fed door or gate release mechanism, a corkscrew mechanism, magnetic or electromagnetic force, pneumatics, fluidics, or an explosive or chemical reaction for launching the devices may be used. In the preferred embodiment, the deployment mechanism 112 comprises solenoids. When not in use, they are retracted, allowing the illumination devices 300 to reside within the deployment system, coupled to the mechanism 114. To deploy an illumination device 300, its solenoid extends, as illustrated by solenoid 112'. The extension of the solenoid 112' pushes the illumination device 300 away from the mechanism 114, causing the illumination device 300 to exit the deployment system.

For example, in the preferred embodiment, the system is mounted in a vehicle's trunk. A person or an automated system, using an interface inside the vehicle, commands the solenoids 112 to extend, pushing the illumination devices 300 out of the vehicle and onto a road. The person or system can control when each of the illumination devices 300 is deployed. Additional controls can be used to enhance the usability of the illumination devices 300, for example, by allowing the person or automated system to selectively deploy only fully charged illumination devices.

Alternatively, the deployment system can also be mounted outside of the vehicle, such as to the bumper or to the rear quarter panel. The deployment system can also be a free standing unit. Various interfaces may be used to control the deployment. For example, deployment can be controlled through an interface inside the vehicle or may be remotely controlled. Multiple deployment systems may be installed internally or externally to a vehicle. The multiple systems can be controlled with one user interface or one automatic controller.

FIGS. 3A–3G illustrate an isometric, top, bottom, front, left, right and back views, respectively, of a preferred embodiment of an illumination device utilized in the deployment system in accordance with the present invention. The device 300 comprises an inner shell 302 and an outer layer 304 encasing the inner shell 302. In the preferred embodiment, the inner shell 302 is clear. The outer layer 304 comprises windows 306 through which light-emitting devices (not shown) within the inner shell 302 may emit light. "Light", as used in this specification, refers to any wavelength of light, including but not limited to visible and infrared light. The device 300 further comprises notches 308a–308b on the inner shell 302. "Notches", as used in this specification, refer to one or more grooves, channels, fins, wedges, or other structures that aid in alignment, guiding, or coupling of the device 300. Within each notch 308a–308b are holes 320a–320b in the inner shell 302. Residing within each hole 320a–320b is a contact 310a–310b. In the preferred embodiment, an energy source (hidden) residing within the inner shell 302 is used to power the device 300. If the energy source is a rechargeable power source, then the contacts 310a–310b provide electrical connections between the clamps 108 of the mechanism 114 in the deployment system and the device 300 to recharge the energy source. Proximate to the notches 308a–308b are pockets 322a–322b. The pockets 322a–322b allow various devices, such as chargers, barricade mounts, bike mounts, security cables, etc., to couple to the device 300. Any of the surfaces of the device 300 can rest upon a surface, such as a road, with each side emitting light. This allows the device 300 to be equally usable on each side, increasing its ease of use. For example, the device 300 can be deployed onto a road without being concerned about which side of the device 300 faces upwards.

FIG. 4 illustrates an exploded view of the preferred embodiment of the illumination device utilized in the deployment system in accordance with the present invention. As illustrated in this view, the inner shell 302 of the device 300 may comprise two substantially symmetrical halves 302a and 302b. Residing within the two halves 302a–302b include the energy source 312, a printed circuit board (PCB) 314, and one or more light-emitting devices 318 coupled to the PCB 314. The light-emitting devices 318 can emit visible light, infrared light, or light of other wavelengths. The light-emitting devices 318 may be selected for their optical radiation pattern, and be positioned and spaced to provide uniform illumination about the circumference of the device 300. The windows 306 of the outer layer 304 are also positioned and spaced to facilitate this uniform illumination. Each light-emitting device 318 is angled to emit light in a range, such that the entire circumference of the device 300 is illuminated. One or more sides may emit less light than other sides in the device 300, as the optical radiation pattern may be adjusted for the desired application. In the preferred embodiment, discrete light emitting diodes (LEDs) are used. However, other light-emitting, light guiding, and optical beam shaping devices may be used without departing from the spirit and scope of the present invention. For example, a waveguide or surface-mounted emitters may be used. A laser source, a fluorescent tube, a strobe light, or an incandescent bulb may be used. Other optical components, such as refractive or diffractive lenses, may be added to enhance the light emission. In addition, other types of circuits may be used other than a PCB. For example, a flex circuit board may be used. The inner shell 302 may be a solid piece with embedded light emitting devices and circuits suspended within the piece, the shell 302 being filled with a gel, a fluid, or a compound that hardens after filling the shell 302. Also, the energy source 312 can be any type of energy-providing mechanism, such as rechargeable batteries, alkaline batteries, solar cell, or an inductive power source. Alternatively, the energy source 312 may be omitted, and an external power source be may used.

Also residing within the inner shell 302 are the contacts 310*a* and 310*b*. One contact 310*a* resides within a hole 320*a* of one half 302*a* of the inner shell 302. The other contact 310*b* resides within a hole 320*b* of the other half 302*b* of the inner shell 302. The contacts 310*a*–310*b* provide electrical contacts between the energy source 312 and the clamps 108 of the charging or holding mechanism 114 of the deployment system via the PCB 314, if the energy source 312 is a rechargeable power source. If the energy source 312 is not of the type that requires charging, then the contacts 310*a*–310*b*, the holes 320*a*–320*b*, and o-rings 316*a*–316*b* may be omitted. In the preferred embodiment, the contacts 310*a*–310*b* protrude slightly above the inner surface of the notches 308*a*–308*b* to ensure proper electrical contact with the clamps 108. Each contact 310*a*–310*b* comprises one or more indentations about its circumference, within which o-rings 316*a*–316*b* may reside, respectively. The o-rings 316*a*–316*b* provide seals between their respective contacts 310*a*–310*b* and the walls of the holes 320*a*–320*b*.

The two halves 302*a*–302*b* of the inner shell 302 and the components residing within are surrounded by the outer layer 304. In the preferred embodiment, the outer layer 304 is provided by placing the assembled inner shell 302 and components into an injection mold or over-mold, and injecting a material into the mold. The material is heated such that it chemically bonds with the surface of the inner shell 302, forming a seal. The outer layer 304 is thus formed as a single piece that seals the contact region between the two halves 302*a*–302*b* of the inner shell 302. In the preferred embodiment, the material for the outer layer 304 is rubber or a flexible plastic, which not only seals and protects the inner shell 302, but also prevents the device 300 from sliding when hit or run over by moving objects. Also, the outer layer 304 can be of a color that enhances its visibility, such as a fluorescent color, a reflective color, or a retroreflective pigment. In some applications, the outer layer 304 may be of a color that diminishes its visibility. Although the outer layer 304 is described as being provided using an injection or over-mold, other means of providing the outer layer 304 may be used. For example, the outer layer 304 may be provided as two separate pieces, coupled by an o-ring. Ultrasonic welding, epoxy, or spinning the two pieces to create heat may be used to seal them, or some other coupling means may be used. In addition, although the outer layer 304 is described above as having windows 306, other configurations of openings for the purpose of allowing light to emit from the device 300 may be used. The outer layer 304 may be optically clear or translucent so that no openings in the outer layer 304 are needed to create windows.

Figure 5:
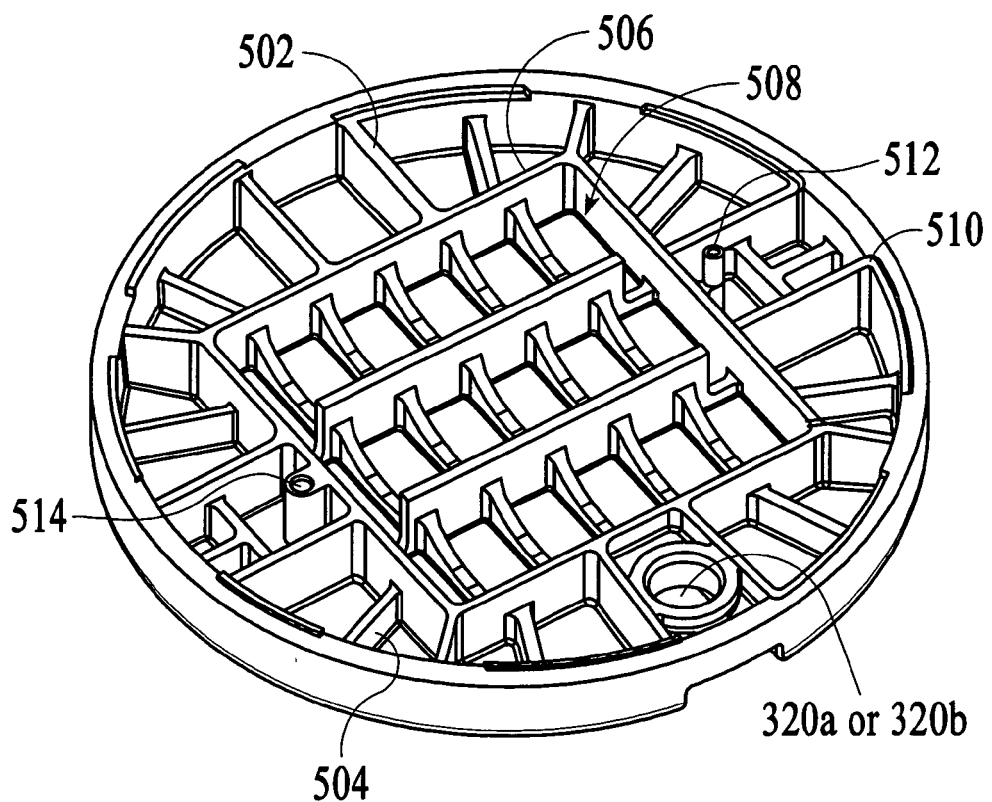
FIG. 5 illustrates in more detail one half of the inner shell 302 of the device 300 in accordance with the present invention.

FIG. 5 illustrates in more detail one half of the inner shell 302 of the device 300 in accordance with the present invention. In the preferred embodiment, the halves 302*a*–302*b* are substantially identical. Thus, the illustrated half of the inner shell 302 may be either half 302*a* or 302*b*. Each half of the inner shell 302 comprises a plurality of primary ribs 502 which provide rigidity to the inner shell 302. The inner shell 302 also comprises a plurality of secondary ribs 504, which provide additional rigidity where needed or desired. The combination of the primary ribs 502 and the secondary ribs 504 enhance the rigidity of the device 300 without increasing its wall thickness. A maximum wall thickness may be imposed by an injection molding process. The height of the secondary ribs 504 are such that clearance for the PCB 314 and other electronics are provided. Also, they are placed in regions that do not interfere with the other components within the inner shell 302. When assembled, the primary ribs 502 of the two halves 302*a*–302*b* of the inner shell 302 sandwich the PCB 314 to prevent the PCB 314 from shifting.

A set of ribs 506 are provided proximate to the center of the inner shell 302 to prevent bowing of the inner shell 302 at the center. These ribs 506 also form a cavity 508 within which the energy source 312 resides. The height of the ribs 506 are approximately the same as the primary ribs 502. Within the cavity 508 are more ribs 510 to support the energy source 312. When assembled, the ribs 510 within the cavity 508 in one half 302*a* of the inner shell 302 contact the ribs 510 within the cavity 508 in the other half 302*b* of the inner shell 302.

Although the preferred embodiment is described with the illustrated configuration of ribs, one of ordinary skill in the art will understand that other configurations are possible without departing from the spirit and scope of the present invention. In fact, the device in accordance with the present invention can be a solid piece with no ribs at all. It can also comprise a liquid, gel, or some other compliant inner material, within which a circuit board resides.

Each half 302*a*–302*b* of the inner shell also comprises a hole 320*a* within which a contact 310*a* resides. To assist in coupling the two halves of the inner shell 302, each half has a peg 512 and a peg hole 514. The peg 512 of one half fits within the peg hole 514 of the other half. The inner shell can also comprise a latch (not shown) or additional ribs and grooves or notches that enhance the robustness of the coupling of the two halves 302–302*b*. The final sealing of the two halves 302*a*–302*b* is provided by the outer layer 304, as described above.

Figure 6:
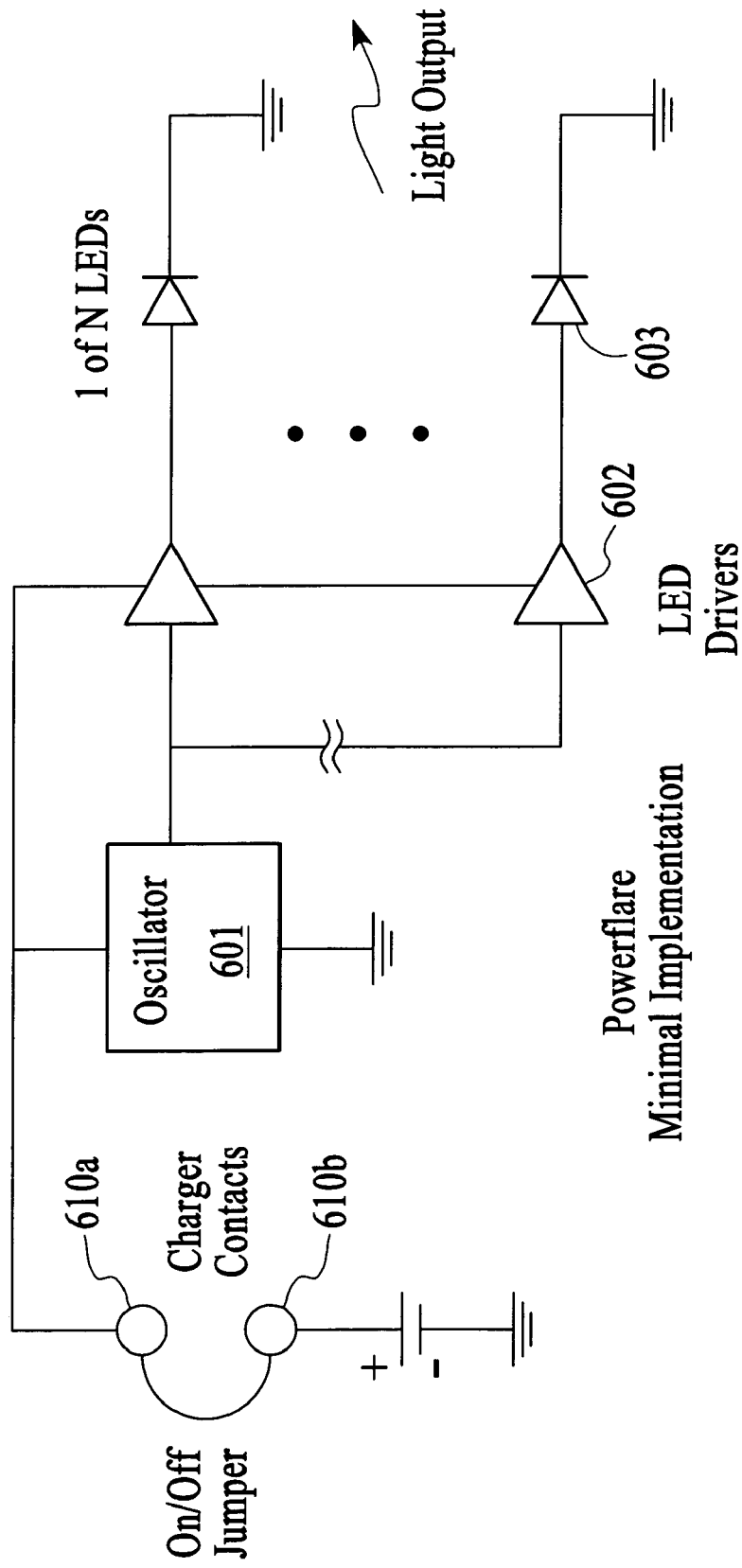
FIG. 6 illustrates a first preferred embodiment of power management electronics for the illumination device utilized in the deployment system in accordance with the present invention.

FIG. 6 illustrates a first preferred embodiment of power management electronics for the illumination device utilized in the deployment system in accordance with the present invention. The electronics comprises an oscillator 601 that provides a waveform to the LED drivers 602, which in turn provides the outputs 603 to the light-emitting devices 118. The electronics are powered by a voltage source. The contacts 610*a*–610*b* can also be used to turn the device 300 on and off.

Figure 7:
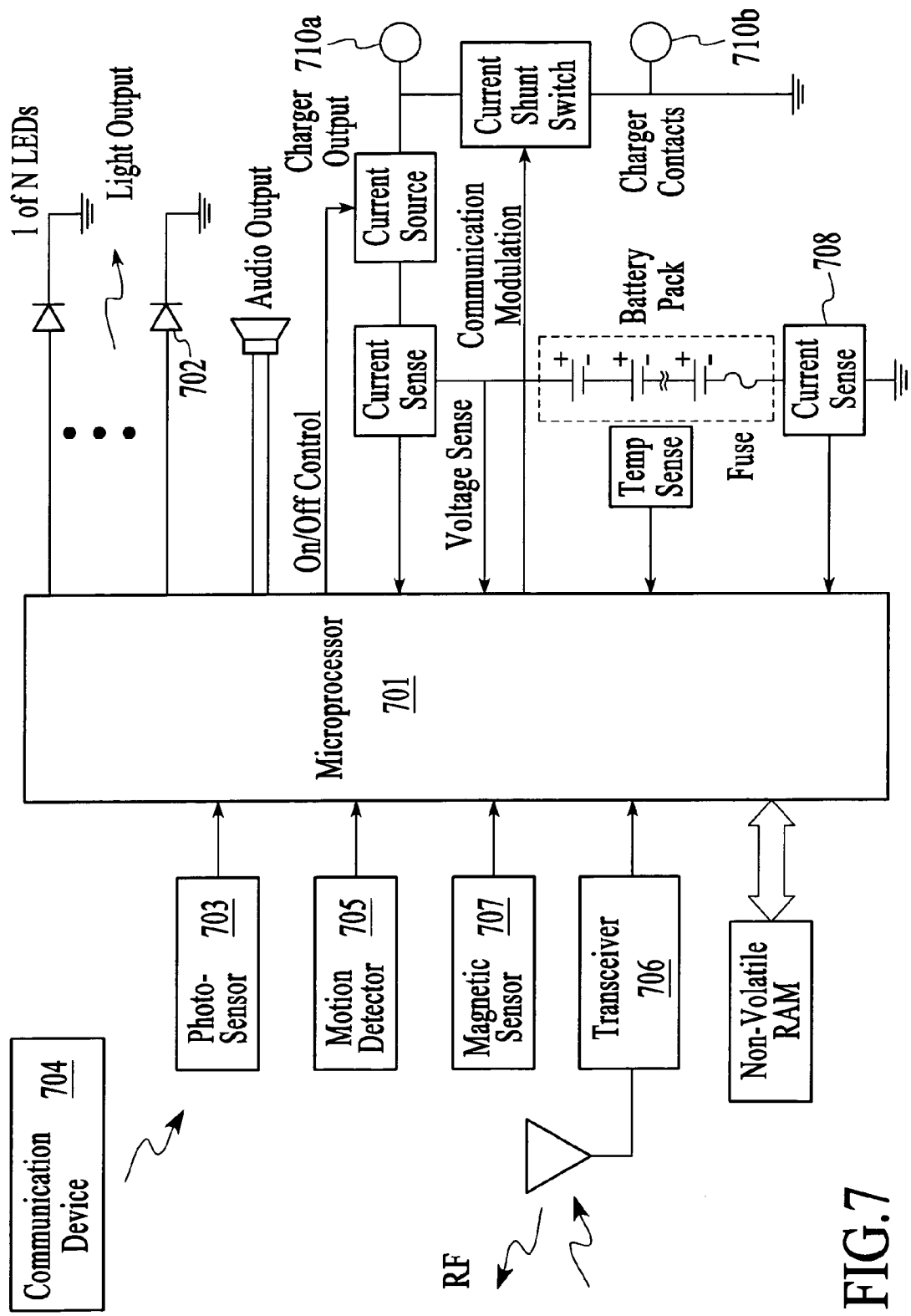
FIG. 7 illustrates a second preferred embodiment of power management electronics for the illumination device utilized in the deployment system in accordance with the present invention.

FIG. 7 illustrates a second preferred embodiment of power management electronics for the illumination device utilized in the deployment system in accordance with the present invention. The electronics comprises a programmable microprocessor 701. The microprocessor 701 has a plurality of outputs, one for each light-emitting device 318, where the outputs control each light-emitting device 318 independently of each other. By controlling the light-emitting devices 318 in this manner, any flashing or signaling pattern can be implemented. The electronics further has a suite of sensors and controls as described below.

The photosensor 703 may be used to monitor the ambient light and adjust the intensity of the light-emitted devices 318 accordingly. For example, during daylight, the light-emitting devices 318 may be driven to maximum intensity to increase visibility, while during the night, their intensity may be reduced so as not to unnecessarily distract or blind a viewer. Reduced optical output also reduces power consumption, thus increasing the lifetime of a non-rechargeable battery, or it increases time between charging of a rechargeable battery, if a battery is used as the energy source 312. The photosensor 703 can further function as a communication receiver. With the use of a light-based communication device 704, modulated light encoded with configuration or other information can be transmitted to the device 300. The device 300 can use at least one of its light-emitting devices 318 to respond by sending data back to the communication device 704. This function is especially useful as it allows for field programmability in certain situations. For example, it is useful in targeting, "arming" a motion sensor, or configuring a synchronized cluster of devices 300.

The motion detector 705 is a micro-electromechanical system-based accelerometer or an optical-based motion detector used to detect tampering or motion. For example, once one or more of the devices 300 are deployed, the motion detector 705 can be used to detect potential theft. A siren or speaker can then be enabled to deter such theft. For another example, in targeted marking applications, the motion detection can be used to disable the device 300 or enable an alarm whenever unauthorized movement is sensed.

The radio frequency (RF) transceiver 706 is a two-way communication link for controlling a network of devices 300. Using this functionality, a plurality of the devices 300 can be synchronized to emit particular light patterns. This can enhance visibility of the devices 300 in traffic control, landing zone markings, or other such applications. Additionally, the RF transceiver 706 can be used to transmit warnings to a user's pager or some similar device that a possible theft or tampering has occurred.

The magnetic sensor 707 functions as a communication port. Using a permanent magnet or electromagnet, the device 300 can be sequenced through a series of pre-defined states (e.g., different flash patterns or the off state). Also, using a higher-speed electromagnetic device, the device's operational modes can be re-programmed in a similar manner as with the light and RF sensor inputs, described above.

The contacts 710a–710b may be used to recharge the energy source 312. They may also be used as an external switch to activate or deactivate the circuitry or to convey information to the device 300. For example, the light output 702 may be activated when the contacts 710a–710b are electrically coupled.

The internal sensors 708 comprise a plurality of sensors for monitoring the state of the energy source 312, both during normal operation and during charging. It is particularly important when high energy density batteries are used as the energy source 312. For monitoring an input voltage from a charging mechanism and modulating the input current, a two-way communications link is established between the device 300 and the charging or holding mechanism 114. This guarantees that only a matching charging mechanism can be used, which functions as a theft deterrent. The two-way communications link can also be used as a smart link for production testing, ID code downloading, flashing pattern configuration, etc. By monitoring the energy source's temperature, voltage, and current, the microprocessor 701 can uniquely charge any type of energy source chemistry as well as optimize the charging algorithm to complement the sometimes irregular use of the device 300.

In the preferred embodiment, the device 300 automatically turns on when it senses that it is no longer attached to the charging or holding mechanism 114. Alternatively, the device 300 can be turned on when it receives an external signal via received at its communications port, or when its motion detector 705 or accelerometer detects its deployment. The motion detector 705 or accelerometer may be internal to or external to the device 300.

The illumination device is further described in co-pending U.S. patent application, titled "Ruggedized Illuminating, marking, or Signaling Device and System", Ser. No. 10/712,431, filed on Nov. 12, 2003, and assigned to the assignee of the present application which is incorporated herein by reference in its entirety.

Figure 8:
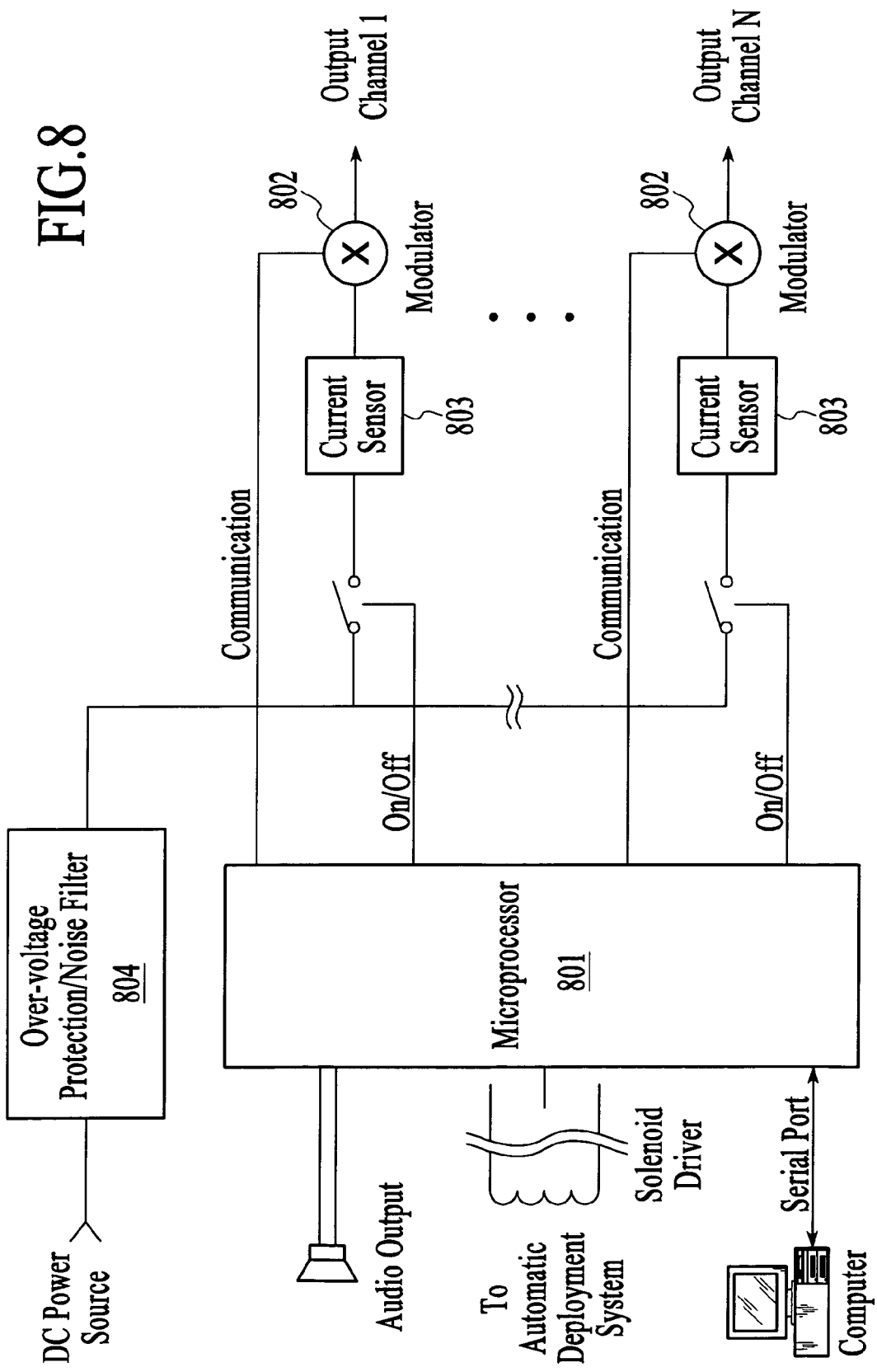
FIG. 8 illustrates a preferred embodiment of power management electronics for the charging or holding mechanism of the deployment system in accordance with the present invention.

As with the device 300, power management can also occur at the charging or holding mechanism 114. FIG. 8 illustrates a preferred embodiment of power management electronics for the charging or holding mechanism of the deployment system in accordance with the present invention. The electronics comprises a microprocessor 801 that controls delivery of power to and from the energy source 312. In addition, the electronics comprises a voltage modulator 802, current sensors 803, and over-voltage protection 804. The voltage modulator 802 allows the charger to transmit information to the device 300 being charged. The information is encoded onto the delivered power by adding a voltage-modulated component to the delivered power. The current sensors 803 monitor the current delivered to the device 300. The device 300 can modulate the incoming current used to encode data useful to the charging system, including identification and logged information, such as motion disturbances, etc. The current sensors 803 are also used to determine if the charging circuit is outside the normal limits of use, and if so, the microprocessor 801 may protect the energy source 312 from damage. For example, the microprocessor 801 may cut the power being delivered to energy source 312. This fail-safe mechanism is particularly important when high energy density batteries are used.

Microprocessor 801 may also be used to control activation of solenoids 112, and management of a user interface that reports the readiness of the illumination devices 300. Microprocessor 801 may also control an illumination device locking mechanism, such as a door or mechanical interlock that prevents illumination devices 300 from falling out of the charging or holding mechanism 114 when subjected to vibration. The locking mechanism could also protect the illumination devices 300 and charging electronics inside the system from theft and adverse weather conditions.

Using the power management illustrated above in FIGS. 7 and 8, the ease of use of the deployment system is enhanced. The user need not worry about the vehicle's batteries being discharged by the charger. If the charging or holding mechanism 114 is connected to a vehicle's battery, the mechanism 114 will not cause the vehicle battery to go dead, as it continuously monitors the vehicle battery voltage. The mechanism 114 uses several efficient power conversion techniques to reduce the current drain from the vehicle battery. For example, the maximum current draw for five completely uncharged devices 300 may be only about 1.5 amps. After about three hours of charging, when the devices 300 are fully charged, the current draw will drop to less than 100 mA.

In addition, a vehicle battery safeguard can be built into the charging or holding mechanism 114. A voltage sensor can determine whether it is safe to drain power from the vehicle battery to charge the devices 300. The mechanism 114 will cease charging if the vehicle battery voltage drops below the normal level. This feature is particularly important if more than one charger is connected to the same vehicle battery.

An improved deployment system for illumination devices has been disclosed. The system comprises a holding or charging mechanism for engaging at least one illumination device, and a deploying mechanism for causing the at least one illumination device to exit the system. The at least one illumination device includes: a shell comprising a plurality of sides, wherein the at least one illumination device can be positioned upon a surface or attached or suspended at any of the plurality of sides; and at least one light-emitting device within the shell, wherein when the at least one illumination device is positioned upon a surface or attached or suspended at any of the plurality of sides of the shell, light from the at least one light-emitting device emits through each of the plurality of sides of the shell. The system allows a user to deploy illumination devices without being exposed to dangerous conditions. For example, the system can be mounted internally or externally to a law enforcement, road crew, or utility company vehicle. The user may then deploy the illumination devices to mark the road without being subjected to the dangers of oncoming traffic. Similarly, the system could be mounted internally or externally to an aircraft or watercraft.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system, comprising:
    a holding mechanism for engaging at least one illumination device, wherein the at least one illumination device is non-incendiary, wherein the holding mechanism comprises:
        a clamp for contacting the at least one illumination device,
        a guide for engaging the illumination device to ensure proper orientation of the at least one illumination device,
        a charging mechanism, wherein the charging mechanism comprises a circuit board coupled to the clamp, wherein the clamp forms an electrical connection between the at least one illumination device and the charging mechanism; and
    a deploying mechanism for causing the at least one illumination device to exit the system.

2. The system of claim 1, wherein the holding mechanism comprises one of a group consisting of:
    a clamp;
    a magnetic coupling mechanism;
    a compliant coupling mechanism; and
    a chemical adhesive.

3. The system of claim 1, further comprising a locking mechanism to prevent accidental deployment of the at least one illumination device from the system.

4. The system of claim 1, wherein the deploying mechanism comprises at least one solenoid, wherein the at least one solenoid extends to cause the at least one illumination device to exit the system.

5. The system of claim 1, wherein the deployment mechanism consists of one of a group comprising:
    a gravity-fed door;
    a gate release mechanism;
    a corkscrew mechanism;
    an explosive;
    a chemical reaction;
    magnetic or electromagnetic force;
    pneumatics;
    fluidics;
    an electric motor;
    an internal combustion engine; and
    at least one solenoid.

6. The system of claim 1, further comprising a housing, wherein the holding mechanism resides within the housing.

7. The system of claim 6, further comprising an inner plate coupled to the housing, wherein the inner plate comprises at least one slot, wherein the at least one illumination device resides within the at least one slot when engaged with the holding mechanism.

8. A system, comprising:
    a holding mechanism for engaging at least one illumination device, wherein the at least one illumination device is non-incendiary;
    a deploying mechanism for causing the at least one illumination device to exit the system, wherein the least one illumination device comprises:
        a shell comprising a plurality of sides, wherein the at least one illumination device can be positioned upon a surface or attached or suspended at any of the plurality of sides; and
        at least one light-emitting device within the shell, wherein when the at least one illumination device is positioned upon a surface or attached or suspended at any of the plurality of sides of the shell, light from the at least one light-emitting device emits through all of the plurality of sides of the shell; and
    a communication port for transmitting a signal from the device and for receiving a signal from outside the at least one illumination device.

9. The system of claim 8, wherein a signal programming a pattern of light emission is received by the at least one illumination device utilizing the communication port.

10. The system of claim 8, wherein a signal programming the at least one illumination device in synchronization or cooperation with other illumination devices in a network is received or sent by the at least one illumination device utilizing the communication port.

11. The system of claim 8, wherein the at least one illumination device receives a signal at its communication port to turn on or off.

12. The system of claim 1, wherein the system is utilized in traffic safety or control.

13. The system of claim 1, wherein the at least one illumination device automatically turns on when disengaged from the holding mechanism.

14. A system, comprising:
    a holding mechanism for engaging at least one illumination device, the at least one illumination device comprising:
        a shell comprising a plurality of sides, wherein the at least one illumination device can be positioned upon a surface or attached or suspended at any of the plurality of sides, and
        at least one light-emitting device within the shell, wherein when the at least one illumination device is positioned upon a surface or attached or suspended at any of the plurality of sides of the shell, light from the at least one light-emitting device emits through each of the plurality of sides of the shell; and
    a deploying mechanism for causing the at least one illumination device to exit the system,
    wherein the holding mechanism comprises:
        a clamp for contacting the at least one illumination device;

a guide for engaging the illumination device to ensure proper orientation of the illumination device; and a charging mechanism, wherein the charging mechanism comprises a circuit board coupled to the clamp, wherein the clamp forms an electrical connection between the at least one illumination device and the charging mechanism.

15. A system, comprising:
a first deployment system, comprising:
   a first holding mechanism for engaging at least a first illumination device, wherein the first illumination device is non-incendiary, wherein the first holding mechanism comprises:
      a clamp for contacting the first illumination device;
      a guide for engaging the first illumination device to ensure proper orientation of the first illumination device; and
      a charging mechanism, wherein the charging mechanism comprises a circuit board coupled to the clamp, wherein the clamp forms an electrical connection between the first illumination device and the charging mechanism; and
   a first deploying mechanism for causing the first illumination device to exit the first deployment system; and
a second deployment system, comprising:
   a second holding mechanism for engaging at least a second illumination device, wherein the second illumination device is non-incendiary, and
   a second deploying mechanism for causing the second illumination device to exit the second deployment system.

16. The system of claim 15, wherein the second holding mechanism comprises:
   a clamp for contacting the second illumination device; and
   a guide for engaging the second illumination device to ensure proper orientation of the second illumination device.

17. The system of claim 15, wherein the first holding mechanism comprises one of a group consisting of:
   a clamp;
   a magnetic coupling mechanism; and
   a chemical adhesive.

18. The system of claim 15, wherein the second holding mechanism comprises one of a group consisting of:
   a clamp;
   a magnetic coupling mechanism;
   a compliant coupling mechanism; and
   a chemical adhesive.

19. A system, comprising:
a first deployment system, comprising:
   a first holding mechanism for engaging at least a first illumination device, wherein the first illumination device is non-incendiary; and
   a first deploying mechanism for causing the first illumination device to exit the first deployment system; and a second deployment system, comprising:
   a second holding mechanism for engaging at least a second illumination device, wherein the second illumination device is non-incendiary, wherein the second holding mechanism comprises,
      a clamp for contacting the first illumination device;
      a guide for engaging the first illumination device to ensure proper orientation of the first illumination device; and
      a charging mechanism, wherein the charging mechanism comprises a circuit board coupled to the clamp, wherein the clamp forms an electrical connection between the second illumination device and the charging mechanism; and
   a second deploying mechanism for causing the second illumination device to exit the second deployment system.

20. The system of claim 15, wherein the first deployment system comprises at least one solenoid, wherein the at least one solenoid extends to cause the first illumination device to exit the first deployment system.

21. The system of claim 15, wherein the first deployment mechanism consists of one of a group comprising:
   a gravity-fed door;
   a gate release mechanism;
   a corkscrew mechanism;
   an explosive;
   a chemical reaction;
   magnetic or electromagnetic force;
   pneumatics;
   fluidics;
   an electric motor;
   an internal combustion engine; and
   at least one solenoid.

22. The system of claim 15, wherein the second deployment system comprises at least one solenoid, wherein the at least one solenoid extends to cause the second illumination device to exit the second deployment system.

23. The system of claim 15, wherein the second deployment mechanism consists of one of a group comprising:
   a gravity-fed door;
   a gate release mechanism;
   a corkscrew mechanism;
   an explosive;
   a chemical reaction;
   magnetic or electromagnetic force;
   pneumatics;
   fluidics;
   an electric motor;
   an internal combustion engine; and
   at least one solenoid.

24. The system of claim 15, further comprising an interface or automatic controller for controlling both the first and second deployment systems.

* * * * *